(12) United States Patent
Lee et al.

(10) Patent No.: US 9,866,278 B2
(45) Date of Patent: Jan. 9, 2018

(54) WIRELESS POWER REPEATER

(75) Inventors: Jung Oh Lee, Seoul (KR); Woo Kil Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 847 days.

(21) Appl. No.: 14/344,023

(22) PCT Filed: Aug. 10, 2012

(86) PCT No.: PCT/KR2012/006389
§ 371 (c)(1),
(2), (4) Date: May 13, 2014

(87) PCT Pub. No.: WO2013/035986
PCT Pub. Date: Mar. 14, 2013

(65) Prior Publication Data
US 2014/0292100 A1    Oct. 2, 2014

(30) Foreign Application Priority Data
Sep. 9, 2011 (KR) .................. 10-2011-0092016

(51) Int. Cl.
*H04B 5/00* (2006.01)
*H01F 38/14* (2006.01)
*H02J 17/00* (2006.01)

(52) U.S. Cl.
CPC .......... *H04B 5/0037* (2013.01); *H01F 38/14* (2013.01); *H02J 17/00* (2013.01)

(58) Field of Classification Search
CPC ......... H04B 5/0037; H01F 38/14; H02J 17/00
See application file for complete search history.

(56) References Cited

U.S. PATENT DOCUMENTS

| 9,530,555 B2* | 12/2016 | Teggatz | H01F 38/14 |
| 2009/0134712 A1* | 5/2009 | Cook | H02J 5/005 |
| | | | 307/104 |
| 2010/0201189 A1* | 8/2010 | Kirby | H04B 5/0037 |
| | | | 307/9.1 |

(Continued)

FOREIGN PATENT DOCUMENTS

| CN | 101924399 A | 12/2010 |
| JP | 04-317527 A | 11/1992 |

(Continued)

OTHER PUBLICATIONS

European Search Report dated Feb. 3, 2015 in European Application No. 14169233.5.

(Continued)

*Primary Examiner* — Jared Fureman
*Assistant Examiner* — Emmanuel R Dominique
(74) *Attorney, Agent, or Firm* — Saliwanchik, Lloyd & Eisenschenk

(57) ABSTRACT

Disclosed is a wireless power repeater. The wireless power repeater repeats power between a wireless power transmitter and an electronic device. The wireless power repeater includes a charging container having at least one side, wherein the charging container has a form for receiving the electronic device, a repeating coil placed at one of the at least one side of the charging container to repeat the power between the wireless power transmitter and the electronic device using resonance.

8 Claims, 2 Drawing Sheets

(56) References Cited

U.S. PATENT DOCUMENTS

| | | | | |
|---|---|---|---|---|
| 2010/0201201 A1* | 8/2010 | Mobarhan | ............... | H02J 5/005 307/104 |
| 2010/0201202 A1 | 8/2010 | Kirby et al. | | |
| 2010/0201311 A1* | 8/2010 | Lyell Kirby | .............. | A61L 2/02 320/108 |
| 2010/0219183 A1* | 9/2010 | Azancot | .................. | H01F 38/14 219/676 |
| 2010/0259108 A1* | 10/2010 | Giler | .................... | B60L 11/182 307/104 |
| 2012/0001497 A1* | 1/2012 | Sada | ....................... | H02J 5/005 307/104 |
| 2013/0285606 A1* | 10/2013 | Ben-Shalom | .......... | H01F 38/14 320/108 |

FOREIGN PATENT DOCUMENTS

| | | |
|---|---|---|
| JP | 2005-124324 A | 2/2007 |
| JP | 2011/151989 A | 8/2011 |
| KR | 10-2007-0017804 A | 5/2005 |
| KR | 10-2008-0096919 A | 11/2008 |
| WO | WO-2010/093723 A1 | 8/2010 |

OTHER PUBLICATIONS

Office Action dated Oct. 23, 2015 in Chinese Application No. 201280055330.X.

European Search Report dated Jun. 2, 2015 in European Application No. 12830727.9.

International Search Report in International Application No. PCT/KR2012/006389, filed Aug. 10, 2012.

\* cited by examiner

[Fig. 1]
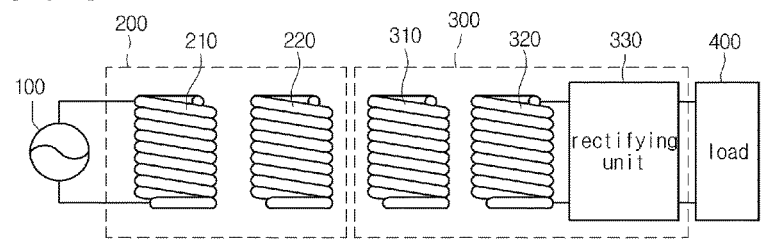
[Fig. 2]
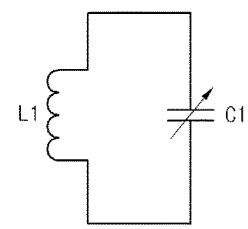
[Fig. 3]
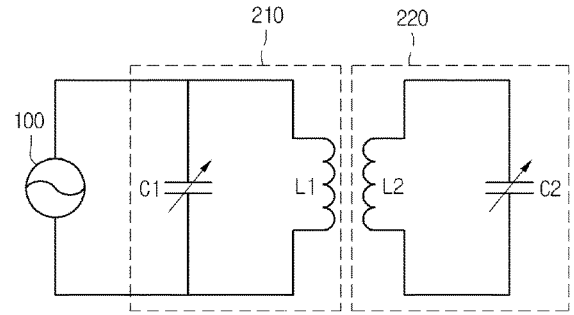
[Fig. 4]
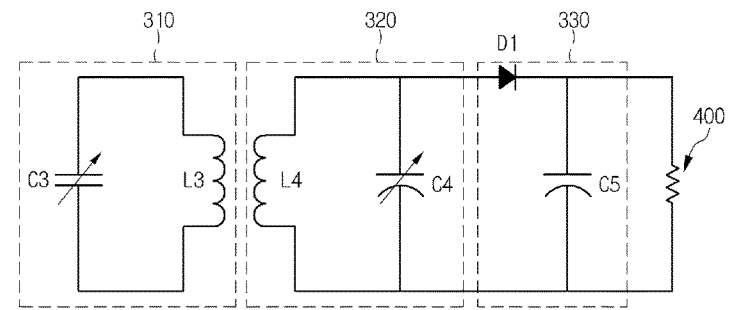
[Fig. 5]
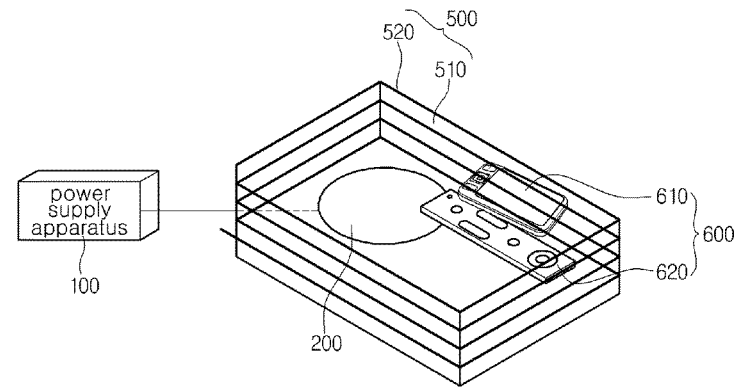

[Fig. 6]
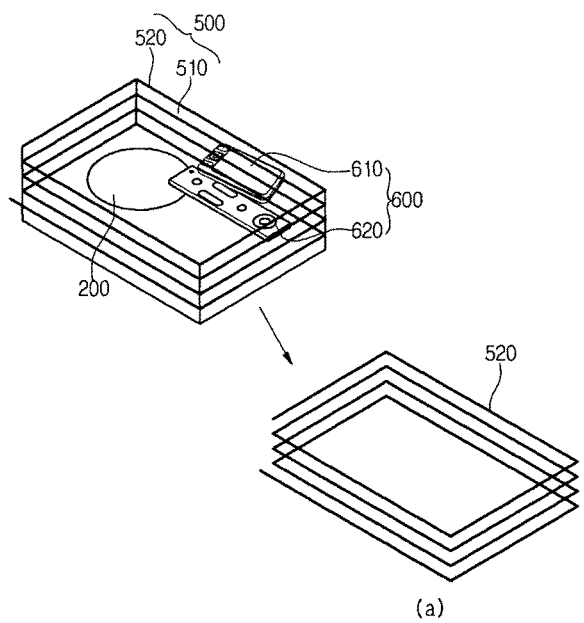
(a)
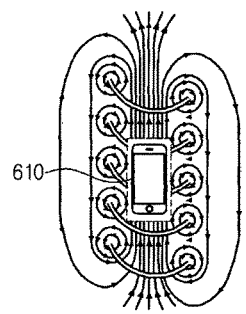
(b)
[Fig. 7]
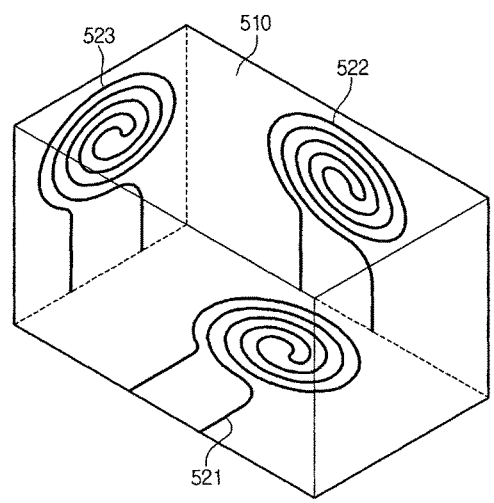

WIRELESS POWER REPEATER

CROSS-REFERENCE TO RELATED APPLICATIONS

This application is the U.S. national stage application of International Patent Application No. PCT/KR2012/006389, filed Aug. 10, 2012, which claims priority to Korean Application No. 10-2011-0092016, filed Sep. 9, 2011, the disclosures of each of which are incorporated herein by reference in their entirety.

TECHNICAL FIELD

The disclosure relates to a wireless power repeater. In more particular, the disclosure relates to a wireless power repeater capable of effectively transmitting power to a plurality of receivers at the same time.

BACKGROUND ART

In general, a portable electronic device such as a cellular phone, a laptop computer, and a PDA is provided therein with a storage battery so that a user can use the portable electronic device while moving.

However, the portable electronic device is equipped with an additional charger to charge power into the storage battery. The charger is connected to a typical power supply to charge power into the storage battery by supplying charge current to the storage battery of the portable electronic device. Meanwhile, in order to allow the charger to supply the charge current to the storage battery of the portable electronic device, a charging main body constituting the charger must be electrically connected to the storage battery of the portable electronic device. In order to electrically connect the charging main body to the storage battery of the portable electronic device, in the case of a wired charger (contact-type charger), the charging main body and the portable electronic device or the storage battery separately include connectors. Accordingly, in order to charge power into the storage battery of the portable electronic device, the connector of the portable electronic device or the storage battery must be mutually connected to the connector of the charging main body.

However, in the contact-type charger having the charging body connected to the storage body or the portable electronic device through the connector, the connector protrudes to the outside, so that an outer appearance is not only degraded, but the connector is contaminated with external foreign matters so that connection failure occurs. In addition, the connector is shorted due to careless use the according to occasions, so that the storage battery may be fully discharged.

In order to solve the problem, a scheme of charging the energy of the charging main body into the storage body by electrically connecting the charging main body to the storage battery of the portable electronic device through a wireless (non-contact) scheme has been developed.

According to the wireless charging scheme, a primary circuit operating at a high frequency constitutes the charging main body, and a secondary circuit constitutes a side of the storage battery, that is, is provided in the portable electronic device or the storage battery, so that the current of the charging main body, that is, energy is supplied to the storage battery of the portable electronic device through the induction coupling. The wireless charging scheme employing the induction coupling has been already employed in several application fields (e.g., electric toothbrush or electric razor).

However, when the wireless charging scheme is applied to portable electronic devices such as a cellular phone, a portable MP3 player, a CD player, an MD player, a cassette tape player, a laptop computer, and a PDA, targets to be charged have various sizes and require various powers (charge capacity) for charging.

Accordingly, when wireless batteries mounted on various electronic devices are charged by using the wireless charger, the wireless charger properly realized based on the size and the capacity of a target to be charged must be used in order to increase the charging efficiency.

However, when a user uses a charger suitable for the charging of each wireless battery in order to charge the wireless batteries mounted on various electronic devices, the user must retain various kinds of wireless chargers. In addition, if necessary, the user must inconveniently look for a wireless charger suitable for each wireless battery to charge the wireless battery.

In addition, since a plurality of portable appliances having different sizes and different shapes cannot be simultaneously charged by using one charging main body, the space may not be easily utilized.

DISCLOSURE OF INVENTION

Technical Problem

The disclosure is to provide a wireless power repeater capable of simultaneously and effectively charging power into various types of receivers having various sizes and shapes regardless of the positions of the receivers by using a resonance phenomenon.

Solution to Problem

According to another embodiment of the disclosure, there is provided a wireless power repeater to repeat power between a wireless power transmitter and an electronic device, which includes a charging container having at least one side, wherein the charging container has a form for receiving the electronic device, a repeating coil placed at one of the at least one side of the charging container to repeat the power between the wireless power transmitter and the electronic device using resonance.

Advantageous Effects of Invention

As described above, according to various embodiments of the disclosure, the effects of the disclosure are as follows.

First, electronic devices can be simultaneously charged regardless of the positions, the sizes, the shapes, and the number of the electronic device using the structure of the repeating coil placed at one side of the charging container.

Second, even if the positions or the directions of the wireless power transmitter and the electronic device are out of the proper positions or the directions, the power transmission efficiency can be increased using the structure of the repeating coil placed at one side of the charging container.

Third, the wireless power efficiency can be increased using the structure of the repeating part to concentrate a magnetic flux.

BRIEF DESCRIPTION OF DRAWINGS

FIG. 1 is a view showing a wireless power transmission system according to one embodiment of the disclosure;

FIG. 2 is a circuit diagram showing an equivalent circuit of the transmission induction coil 210 according to one embodiment of the disclosure;

FIG. 3 is a circuit diagram showing an equivalent circuit of a power supply apparatus 100 and a wireless power transmitter 200 according to one embodiment of the disclosure;

FIG. 4 is a circuit diagram showing an equivalent circuit of a wireless power receiver 300 according to one embodiment of the disclosure;

FIG. 5 is a view showing the wireless power transmission system including a wireless power repeater according to one embodiment of the disclosure;

FIG. 6 is a view showing the structure of the wireless power repeater and the magnetic flux according to one embodiment of the disclosure; and FIG. 7 is a view showing the structure of the wireless power repeater according to still another embodiment of the disclosure.

BEST MODE FOR CARRYING OUT THE INVENTION

Hereinafter, embodiments will be described in detail with reference to accompanying drawings so that those skilled in the art can easily work with the embodiments.

FIG. 1 is a view showing a wireless power transmission system according to one embodiment of the disclosure.

Referring to FIG. 1, the wireless power transmission system may include a power supply apparatus 100, a wireless power transmitter 300, a wireless power receiver 300, and a load 400.

According to one embodiment, the power supply apparatus 100 may be included in the wireless power transmitter 200.

The wireless power transmitter 200 may include a transmission induction coil 210 and a transmission resonant coil 220.

The wireless power receiver 300 may include a reception resonant coil, a reception induction coil 320, a rectifying unit 330, and the load 400.

Both terminals of the power supply apparatus 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying unit 330, and the load 400 is connected to both terminals of the rectifying unit 330. According to one embodiment, the load 400 may be included in the wireless power receiver 300.

The power generated from the power supply apparatus 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power supply apparatus 100 generates AC power having a predetermined frequency and transmits the AC power to the wireless power transmitter 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 using the electromagnetic induction.

Thereafter, the power received in the transmission resonant coil 220 is transmitted to the wireless power receiver 300 that makes a resonance circuit with the wireless power transmitter 200 using resonance.

Power can be transmitted between two LC circuits, which are impedance-matched with each other, using resonance. The power transmitted using the resonance can be father transmitted with higher efficiency when comparing with the power transmitted by the electromagnetic induction.

The reception resonant coil 310 receives power from the transmission resonant coil 220 using the resonance. The AC current flows through the reception resonant coil 310 by the received power. The power received in the reception resonant coil 310 is transmitted to the reception induction coil 320, which is inductively coupled with the reception resonant coil 310, by the electromagnetic induction. The power received in the reception induction coil 320 is rectified by the rectifying unit 330 and transmitted to the load 400.

The transmission resonant coil 220 of the wireless power transmitter 200 may transmit power to the reception resonant coil 310 of the wireless power receiver 300 using a magnetic field.

In detail, the transmission resonant coil 220 and the reception resonant coil 310 are magnetically resonance-coupled and each of them can operate at a resonance frequency.

The resonance-coupling between the transmission resonant coil 220 and the reception resonant coil 310 can significantly improve the power transmission efficiency between the wireless power transmitter 200 and the wireless power receiver 300.

A quality factor and a coupling coefficient are important in the wireless power transmission. In other words, the power transmission efficiency can be gradually improved as the values of the quality factor and the coupling coefficient are increased.

The quality factor may refer to an index of energy that may be received in the vicinity of a wireless power transmitter or a wireless power receiver.

The quality factor may be varied according to the operating frequency w, a coil shape, a dimension, and a material. The quality factor may be expressed as following equation, $Q=w*L/R$. In the above equation, L refers to the inductance of a coil, and R refers to resistance corresponding to the quantity of power loss caused in the coil.

The quality factor may have a value of 0 to infinity.

The coupling coefficient represents the degree of inductive coupling between a transmission coil and a reception coil, and has a value of 0 to 1.

The coupling coefficient may be varied according to the relative position and the distance between the transmission coil and the reception coil.

FIG. 2 is a circuit diagram showing an equivalent circuit of the transmission induction coil 210 according to the one embodiment of the disclosure.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the variable capacitor. The equivalent circuit of the transmission resonant coil 220, the reception resonant coil 310, and the reception induction coil 320 may be the same as those shown in FIG. 2.

FIG. 3 is a circuit diagram showing an equivalent circuit of the power supply apparatus 100 and the wireless power transmitter 200 according to one embodiment of the disclosure.

As shown in FIG. 3, the transmission induction coil 210 and the transmission resonant coil 220 may be constructed by using inductors L1 and L2 and capacitors C1 and C2 having predetermined inductances and capacitances, respectively.

FIG. 4 is a circuit diagram showing an equivalent circuit of the wireless power receiver 300 according to one embodiment of the disclosure.

As shown in FIG. 4, the reception resonant coil 310 and the reception induction coil 320 may be constructed by using inductors L3 and L4, and capacitors C3 and C4 having inductances and capacitances, respectively.

The rectifying unit 330 may be constructed by using a diode D1 and a rectifying capacitor C5 and may output DC power by converting AC power into the DC power.

The rectifying unit 330 may include a rectifier and a smoothing circuit. The rectifier may include a silicon rectifier as a rectifying element.

The smoothing circuit smoothes the output of the rectifier.

The load 400 may include a predetermined rechargeable battery or a device requiring the DC power. For example, the load 400 may refer to a battery.

The wireless power receiver 300 may be mounted on an electronic device, such as a cellular phone, a laptop computer, or a mouse, requiring the power.

The wireless power transmitter 200 may adjust the power transmitted to the wireless power receiver 300 using in-band communication with the wireless power receiver 300.

The in-band communication refers to communication of exchanging information between the wireless power transmitter 200 and the wireless power receiver 300 using a signal having a frequency used in wireless power transmission. The wireless power receiver 300 may receive or may not receive power transmitted from the wireless power transmitter 200 through a switching operation. Accordingly, the wireless power transmitter 200 detects the quantity of power consumed in the wireless power transmitter 200 to recognize an on-signal or an off-signal of the wireless power receiver 300.

In detail, the wireless power receiver 300 may change the power consumption in the wireless power transmitter 200 by adjusting the quantity of power absorbed in a resistor by using the resistor and a switch. The wireless power transmitter 200 detects the variation of the power consumption to acquire the state information of the wireless power receiver 300. The switch may be connected to the resistor in series.

In more detail, if the switch is open, the power absorbed in the resistor becomes zero, and the power consumed in the wireless power transmitter 200 is reduced.

If the switch is closed, the power absorbed in the resistor becomes greater than zero, and the power consumed in the wireless power transmitter 200 is increased. If the wireless power receiver repeats the above operation, the wireless power transmitter 200 detects power consumed therein to make communication with the wireless power receiver 300.

The wireless power transmitter 200 receives the state information of the wireless power receiver 300 through the above operation so that the wireless power transmitter 200 can transmit appropriate power.

In contrast, the wireless power transmitter 200 includes a resistor and a switch to transmit the state information of the wireless power transmitter 200 to the wireless power receiver 300.

FIG. 5 is a view showing the wireless power transmission system including a wireless power repeater according to one embodiment of the disclosure.

Referring to FIG. 5, the wireless power transmission system may include the power supply apparatus 100, the wireless power transmitter 200, and the wireless power repeater 500.

The wireless power transmission system may further include the wireless power receiver 300 shown in FIG. 1. The wireless power receiver 300 may be mounted on an electronic device 600 shown in FIG. 5, and wirelessly receive power from the wireless power transmitter 200, and the wireless power repeater 500.

The wireless power transmitter 200 may include the transmission induction coil 210 and the transmission resonance coil 220 shown in FIG. 1

The wireless power repeater 500 may be resonance-coupled with the wireless power transmitter 200 and the wireless power receiver 300. In other words, the wireless power repeater 500 may receive power from the wireless power transmitter 200 using resonance, and transmit the received power to the electronic device 600 equipped with the wireless power receiver 300 using resonance.

Hereinafter, the power reception of the electronic device 600 will be described on the assumption that the power reception of the electronic device 600 is identically performed the power reception of the wireless power receiver 300 mounted on the electronic device 600.

In other words, the wireless power transmitter 200 receives power from the power supply apparatus 100 connected to an external device, and transmits the power to be transmitted through the coupling with the transmission resonance coil to the wireless power repeater 500 through a non-radiation scheme based on resonance.

The wireless power transmitter 200 may transmit power to the wireless power repeater 500 and to the electronic device 600. In other words, the electronic device 600 may receive power from the wireless power transmitter 200 and the wireless power repeater 500.

The wireless power transmitter 200 may be placed at the bottom side of the electronic device 600 as shown in FIG. 5.

The wireless power repeater 500 may include a charging container 510 and a repeating part 520.

The charging container 510 can receive the electronic device 600. The shape of the charging container 510 may have a hexahedral box shape as shown in FIG. 5. However, the embodiment is not limited thereto, but the charging container 510 may have various shapes, such as a cylindrical shape or a rectangular prism shape, sufficient to receive the electronic device 600.

The repeating part 520 may include a repeating coil and a capacitor constructed for the resonance coupling with the transmission resonance coil of the wireless power transmitter 200.

The capacitor may include a fixed capacitor having a fixed capacitance or a variable capacitor having a variable capacitance.

The repeating coil may be resonance-coupled with the transmission resonance coil 220 of the wireless power transmitter 200 to receive the power at the resonance frequency. The repeating coil may be resonance-coupled with the reception resonance coil 310 mounted on the electronic device 600 to transmit the power to the electronic device 600 at the resonance frequency.

The repeating coil may be provided by forming a repeated pattern along at least one side of the charging container 510 by using one conduction line.

If the charging container 510 has a hexahedral box shape, the repeating coil may be constructed by winding one conduction line around an outer portion of the hexahedral charging container 510 several times.

The charging container 510 may have various structures sufficient to mount the repeating part 520 therein. Preferably, the charging container 510 may include a printed circuit board or a flexible insulating film (base film).

The repeating coil of the repeating part 520 may be provided in a conduction line winding form or a conductor pattern. In other words, the repeating coil of the repeating part 520 may have a conductor pattern in which a metallic thin film including gold (Au), silver (Ag), aluminum (Al), and copper (Cu) representing superior conductivity is stacked on the charging container 510.

Therefore, according to the present description, the repeating coil is understood in a broad sense, and may be formed by winding a conduction line or by etching a metallic thin film. In other words, the repeating coil may have all patterns representing the form of a coil.

The wireless power repeater 500 can transmit power to the electronic device 600 positioned at a place to which the wireless power transmitter 20 cannot transmit power.

For example, if a cellular phone 610 is placed on a remote controller 620, which acts as the electronic device 600 shown in FIG. 5, and the wireless power repeater 500 is not provided, a magnetic field is transmitted to the remote controller 620 by the wireless power transmitter 200. However, the transfer of the magnetic field to the cellular phone 610 is interrupted by the remote controller 620, so that the cellular phone 610 may not effectively receive the power from the wireless power transmitter 200. In this case, the cellular phone 610 may receive power, which cannot receive normally from the wireless power transmitter 200, from the repeating part 520 of the wireless power repeater 500 formed at least one side of the charging container 510.

Although two wireless power receivers 300 are used, even at least two electronic devices 600 can receive power from the wireless power repeater 500 through the structure of the wireless power transmitter 200 and the wireless power repeater 500 shown in FIG. 5 even if the electronic device 600 cannot receive power from the wireless power transmitter 200.

Meanwhile, although the electronic device 600 includes the cellular phone 610 and the remote controller 620 as shown in FIG. 5, the embodiment is not limited thereto. In other words, the electronic device 600 may include various small electronic devices, such as a PDA, a portable MP3 player, and a CD player, requiring the reception of the power.

As shown described, electronic devices 600 can be simultaneously charged with power regardless of the position and the number of the electronic devices 600 by using the wireless power transmitter 200 and the wireless power repeater 500.

FIG. 6 is a view showing the structure of the wireless power repeater and the magnetic flux according to one embodiment of the disclosure.

Hereinafter, a wireless power repeater 500 having a hexahedral structure according to one embodiment of the disclosure will be described.

FIG. 6(*a*) is a view showing the repeating coil of the wireless power repeater 500 according to one embodiment of the disclosure.

Referring to FIG. 6(*a*), the repeating part 520 are placed at the wall side of the charging container in the form of a solenoid coil. As the repeating part 520 has the form of a solenoid coil having a rectangular shape while being wound one conduction line along the wall side of the charging container 510, the magnetic field may be concentrated on the central portion of the bottom side of the wireless power repeater 500. Therefore, when the electronic device 600 is provided at the central portion of the bottom side of the wireless power repeater 500, the electronic device 600 can effectively receive power from the wireless power repeater 500. In addition, in this case, the electronic device 600 can be more rapidly charged with power by receiving power from the wireless power transmitter 200.

Referring to FIG. 6(*b*), a magnetic flux density is concentrated on the cellular phone 610 provided at the central portion of the wireless power repeater 500, so that power transmission can be effectively achieved.

Although the repeating part 520 has the form of a solenoid coil having a rectangular shape according to one embodiment of the disclosure, the disclosure is not limited thereto, but the repeating part 520 may have the form of a solenoid coil having a polygonal shape such as a triangular shape, a hexagonal shape, or an octagonal shape, or a circular shape.

Although the repeating part 520 may be placed at the wall side of the charging container 510 in the form of a solenoid coil, the repeating part 520 may have a spiral form. Even in the case of the spiral stack structure, a magnetic field is concentrated on the central portion of the bottom side of the wireless power repeater 500, and a magnetic flux may be concentrated on the wireless power receiver 300 as shown in FIG. 6(*b*). The spiral form may have a polygonal shape such as a triangular shape, a hexagonal shape, or an octagonal shape, or a circular shape.

FIG. 7 is a view showing the structure of the wireless power repeater according to still another embodiment of the disclosure.

The structure of the wireless power repeater 500 shown in FIG. 7 complements a case in which the power transmission is not efficiently achieved when the wireless power transmitter 200 and the electronic device 600 are out of proper positions (directions) thereof. In other words, in order to allow the electronic device 600 to efficiently receive power from the wireless power transmitter 200, the transmission resonance coil 220 and the reception resonance coil 310 are not out of the proper positions (directions) thereof, so that the magnetic flux generated from the transmission resonance coil 220 must be transmitted to the reception resonance coil 310 as much as possible. For example, when the repeating part 520 is arranged at an angle of 90 degrees about the reception resonance coil 310 included in the electronic device 600, the direction of the magnetic flux may be disoriented and thus cancelled. Accordingly, the power may not be properly transmitted.

In order to solve the problem, the reaping coil at each side of the wireless power repeater 500 may be formed by repeatedly winding one conduction line in a spiral form. As shown in FIG. 7, the repeating part 520 may include a first repeating coil 521, a second repeating coil 52, and a third repeating coil 523.

Although FIG. 7 shows the first to third repeating coils 521, 522, and 523, repeating coils may be additionally placed at wall side of the wireless power repeater 500 except for the top side.

If the first repeating coil 521 is arranged at an angle of 90 degrees about the reception resonance coil of the electronic device 600, the directions of magnetic fluxes are cancelled from each other, so that the power may not be properly transmitted, the directions of the magnetic fluxes of the second and third repeating coils 522 and 523 and the reception resonance coil are not disoriented, so that the power can be effectively transmitted.

In addition, the wireless power repeater 500 further includes a controller (not shown), and the controller enables current to flow through the first to third repeating coils 521, 522, and 523 at a predetermined time intervals. In other words, if the controller generates a magnetic field by alternately applying current to the first to third repeating coils 521, 522, and 523 at a predetermined time interval, power can be effectively transmitted to the electronic device 600 even if power is not stably transmitted between any one repeating coil and the electronic device 600 because the repeating coil and the electronic device 600 are out of the proper positions thereof. For example, even if the reception resonance coil of the electronic device 600 is not arranged at an angle of 90 degrees about the first to third repeating coils 521, 522, and 523, but arranged at a predetermined angle about the first to third repeating coils 521, 522, and 523, the first to third repeating coils 521, 522, and 523 sequentially transmit a magnetic field, so that the power can be effectively transmitted.

An operation allowing current to alternately flow through the first to third repeating coils 521, 522, and 523 at a predetermined time interval can be realized by using a switch.

As described above, even if the repeating part 520 and the electronic device 600 are out of the proper positions (directions) thereof, power can be effectively transmitted to the electronic device 600 due to the structure of the wireless power repeater 500 according to the embodiment of the disclosure.

Although a preferred embodiment of the disclosure has been described for illustrative purposes, those skilled in the art will appreciate that various modifications, additions and substitutions are possible, without departing from the scope and spirit of the invention as disclosed in the accompanying claims.

The invention claimed is:

1. A wireless power transmission system, comprising:
   a power supply apparatus;
   a wireless power transmitter; and
   a wireless power repeater comprising a charging container and a repeating part,
   wherein the charging container has a hexahedral box shape,
   wherein the wireless power repeater repeats power between the wireless power transmitter and an electronic device,
   wherein the repeating part comprises first to third repeating coils that are coupled with the wireless power transmitter by resonance,
   wherein each of the first to third repeating coils comprises a conduction line wound repeatedly to have a spiral form,
   wherein the charging container has a bottom and at least three sides and is configured to receive the electronic device,
   wherein the first to third repeating coils are respectively disposed at the at least three sides of the charging container to repeat the power between the wireless power transmitter and the electronic device,
   wherein the at least three sides of the charging container are arranged at an angle of 90 degrees to each other,
   wherein the wireless power transmitter is disposed at the bottom of the charging container to transmit power to the electronic device positioned on the wireless power transmitter,
   wherein the wireless power repeater is configured to transmit power to the electronic device positioned at a place to which the wireless power transmitter cannot transmit power, and
   wherein the wireless power repeater operates alternately sequentially the first to third repeating coils at a predetermined time interval.

2. The wireless power transmission system of claim 1, wherein the charging container comprises a printed circuit board (PCB).

3. The wireless power transmission system of claim 1, wherein the first repeating coil transmits the power, which has been received therein from the wireless power transmitter, to the electronic device resonance-coupled with the first repeating coil.

4. The wireless power transmission system of claim 1, wherein the wireless power repeater alternately operates the first and second repeating coils at the predetermined time interval using a switch.

5. A wireless power repeater comprising:
   a charging container having a hexahedral box shape, wherein the charging container is configured to receive an electronic device;
   a first coil disposed at a first side of the charging container, comprising a first conduction line wound repeatedly, and coupled with a wireless power transmitter by resonance;
   a second coil disposed at a second side of the charging container, comprising a second conduction line wound repeatedly, and coupled with the wireless power transmitter by resonance;
   a third coil disposed at a third side of the charging container, comprising a third conduction line wound repeatedly, and coupled with the wireless power transmitter by resonance; and
   a controller configured to enable current to flow through the first to third coils at a predetermined time interval,
   wherein the three sides of the charging container are arranged at an angle of 90 degrees to each other,
   wherein each coil has a spiral shape, and
   wherein the controller generates a magnetic field by alternately sequentially applying current to the first, second, and third coils at a predetermined time interval.

6. The wireless power repeater of claim 5, wherein the charging container comprises a printed circuit board (PCB).

7. The wireless power repeater of claim 5, wherein each coil repeats the power between the wireless power transmitter and the electronic device by using resonance.

8. The wireless power repeater of claim 5, wherein the first coil is physically separated from the second coil, the second coil is physically separated from the third coil, and the first coil is physically separated from the third coil.

\* \* \* \* \*